June 20, 1950  B. I. WOOD  2,512,407
MOTOR SHAFT COUPLING
Filed May 23, 1945
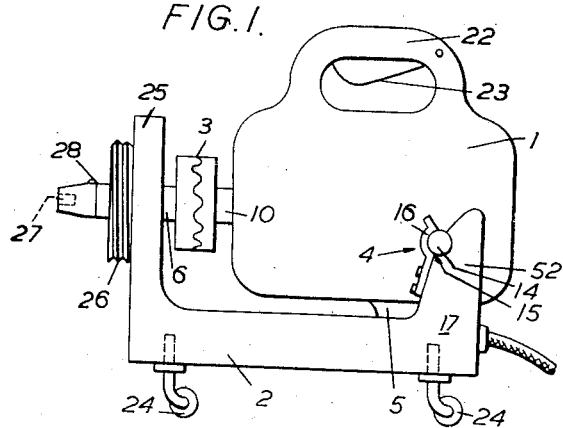
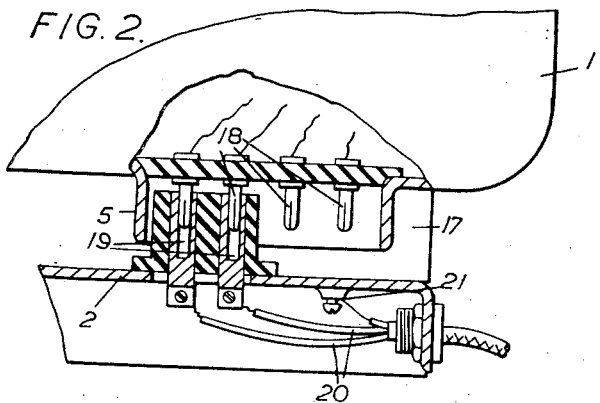
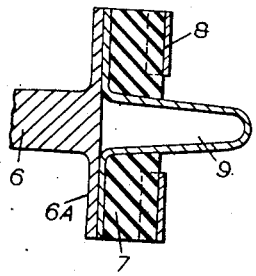
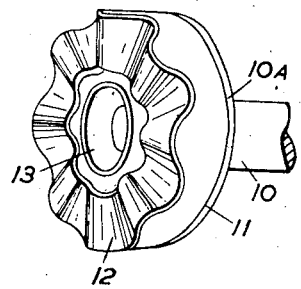
Inventor:
BARBARA ISOBEL WOOD
By Richardson and David
Attorneys Patented June 20, 1950

2,512,407

UNITED STATES PATENT OFFICE 2,512,407

MOTOR SHAFT COUPLING

Barbara Isabel Wood, Uddingston, Scotland

Application May 23, 1945, Serial No. 595,308
In Great Britain June 2, 1944

5 Claims. (Cl. 172—36)

This invention relates to coupling means for a domestic appliance and electric motor.

Electro-motor-driven appliances used in or in conjunction with households comprise chiefly suction cleaners and also such appliances as refrigerators, clothes washing machines with wringers, and sewing machines. The cost of the electric motor is a serious factor in the total cost of any such appliance and would be a prohibitive factor in the total cost of a number of different appliances (which are or obviously could be designed to be electro-motor-driven) if each must be bought in combination with a motor. Accordingly, many households having a suction cleaner have no other electro-motor-driven appliances.

The chief object of this invention is to make provisions whereby it will be possible to purchase an electric motor and any one or more of various domestic appliances adapted to be driven by it, the motor to be available either in combination with an appliance or as a separate entity, and each of the appliances to be available as a separate entity.

A further object of the invention is to provide means enabling quick and easy attachment to or detachment from a domestic electric appliance of an electric driving motor therefor, by a simple manual applying or withdrawing movement of the motor.

Therefore the present invention resides in coupling means for a domestic electric appliance and electric motor comprising co-operating formations on the motor and appliance adapted removably to attach and mount said motor stator to and on said appliance stator in a position ensuring correct drive from motor rotor to stator rotor, said co-operating formations including engageable and disengageable coupling parts on the motor rotor and appliance rotor, detachably interengageable electric connections on the motor stator and on the appliance stator, the connection on the appliance stator being adapted for connection to a source of electric power and to lead said electric power to said motor, whereby the attachment to or removal from said appliance stator of said motor stator, and the engaging or disengaging of the coupling parts and electric connections is effectable respectively by a simple manual applying or withdrawing movement of the motor stator.

I will now describe an embodiment of the invention, simply by way of example, with reference to the accompanying drawing, whereon:

Fig. 1 is an elevation showing the electric motor coupled to the appliance stator, in accordance with the invention, Fig. 2 is an enlarged fragmentary and midsectional elevation showing the interengageable electric connections on the motor and appliance stators, Figs. 3 and 4 are respectively, an enlarged midsectional elevation and a perspective view of part of the coupling and its complementary part.

Referring to the drawings, Fig. 1 shows an electric motor stator 1 attached to an appliance stator 2 by means of a coupling at 3, clip means at 4, and interengageable electric connections housed at 5.

The coupling 3 consists of a part 6A on the appliance rotors 6, a rubber base 7, and a metal facing 8 thereon presenting an annular surface with radial corrugations, while a centralising pin or projection 9 projects centrally therefrom, as shown in Fig. 3. The counterpart of the coupling, as shown in Fig. 4 consists of a part 10A on the motor rotor 10 provided with a cushioning rubber part 11 and a metal facing 12 with radial corrugations complemental to facing 8 and provided with a central recess 13 adapted to receive pin 9 in order to centralise the two parts of the coupling.

The metal and rubber parts of each half of the couplings are bonded together in permanent fashion by known production methods, and thus a coupling is provided which is simple and inexpensive to manufacture, is self-locating, and allows slip without damage until the moment of final engagement. Furthermore, these parts can be instantaneously connected or disconnected.

The clip means, Fig. 1, consists of a projecting pin 14, on each side of the motor stator 1, which seats in a recessed part 15 of the appliance stator 2 and is held in such position by a spring clip 16. The parts 15 and 16 are located on upstanding brackets 17 on the appliance stator 2.

As shown in Fig. 2, the interengageable electric connections consist of plugs 18 on the motor stator, and sockets 19 on the appliance stator 2, the sockets 19 being connected to the source of electric power by the leads 20, and there being an earth connection at 21. As shown, there are two sets of plugs 18, which are connected to different speed windings on the motor. Thus, by spacing the sockets 19 in suitable locations on any appliance stator, the correct speed is automatically selected when the motor stator is applied to the appliance stator and the coupling at 3 is engaged.

The motor stator 1 is provided with a handle 22 and attachment to or removal from the appliance stator 2 of the motor stator 1 can be effected simply by gripping the handle 22 and employing an applying or withdrawing movement so as to engage or disengage respectively the coupling parts at 3 and 4 and the electrical connections at 5.

A switch lever 23 is incorporated in the handle 22, so that, when the latter is gripped, the electric circuit is first broken, before the motor 1 is removed from the appliance stator 2.

As shown in Fig. 1 the appliance stator 2 is provided with the castering wheels 24, and the stator 2 has an upward extension 25 which journals the appliance rotor 6, and is provided with a screw-threaded boss 26 for attachment of a flexible or other extension of the appliance stator. The appliance rotor 6 is adapted for connection to a flexible or other extension of the appliance rotor, and has for this purpose an extension with an internally squared recess 27 and is provided with an outwardly spring-urged plunger 28 for engagement with corresponding co-operating parts on the appliance extension.

The arrangement shown in Fig. 1 is especially for use in driving, for example, a coffee mill, a rotary brush or polisher, or clippers, but it is to be clearly understood that the motor may be equally well coupled to the stator of an appliance such, for example, as a washing machine, vacuum cleaner, sewing machine or wringer.

I claim:

1. Coupling means for a domestic electric appliance and electric motor comprising co-operating formations on the motor and appliance adapted removably to attach and mount said motor stator to and on said appliance stator in a position ensuring correct drive from motor rotor to stator rotor, said co-operating formations including engageable and disengageable coupling parts on the motor rotor and appliance rotor, detachably interengageable electric connections on the motor stator and on the appliance stator, the connection on the appliance stator being adapted for connection to a source of electric power and to lead said electric power to said motor, whereby the attachment to or removal from said appliance stator of said motor stator, and the engaging or disengaging of the coupling parts and electric connections is effectable respectively by a simple manual applying or withdrawing movement of the motor stator.

2. Coupling means for a domestic appliance and electric motor comprising co-operating formations on the motor and appliance adapted removably to attach and mount said motor stator to and on said appliance stator in a position ensuring correct drive from motor rotor to stator rotor, said co-operating formations including engageable and disengageable coupling parts, each part comprising a radially corrugated contact piece resiliently mounted on the motor and appliance rotors and adapted to make driving contact with each other, detachably interengageable electric connections on the motor stator and on the appliance stator, the connection on the appliance stator being adapted for connection to a source of electric power and to lead said electric power to said motor, whereby the attachment to or removal from said appliance stator of said motor stator, and the engaging or disengaging of the coupling parts, and electric connections is effectable respectively by a simple manual applying and withdrawing movement of the motor stator.

3. Coupling means for a domestic appliance and electric motor comprising co-operating formations on the motor and appliance adapted removably to attach said motor stator to said appliance stator in a position ensuring correct drive from motor rotor to stator rotor, said co-operating formations including engageable and disengageable coupling parts, each part including a radially corrugated contact piece resiliently mounted on the motor rotor and appliance rotor and adapted to make a driving contact with each other and also including removably interengageable, complementary projecting means and recessed means adapted to retain the coupling parts in alignment against transverse displacement relative to the axis of the rotors detachably interengageable electric connections on the motor stator and on the appliance stator, the connection on the appliance stator being adapted for connection to a source of electric power and to lead said electric power to said motor, whereby the attachment to or removal from said appliance stator, of said motor stator, and the engagement or disengagement of the coupling parts and electric connections is effectable respectively by a simple manual applying or withdrawing movement of the motor stator.

4. Coupling means for a domestic appliance and electric motor comprising co-operating formations on the motor and appliance, including projection and resilient clip means on the motor stator and appliance stator, engageable and disengageable coupling parts on the motor rotor and appliance rotor, detachably interengageable electric connections on the motor stator and appliance stator, the connection on the appliance stator being adapted for connection to a source of electric power and to lead said electric power to said motor, whereby the attachment to or removal from said appliance stator of said motor stator and the engaging or disengaging of the coupling parts and electric connections is effectable respectively by a simple manual applying or withdrawing movement of the motor stator.

5. Coupling means according to claim 1, in which a plurality of electrical connections is provided on the motor stator connected respectively to different-speed windings on the motor, whereby the speed of the motor is selectable by interengaging the appropriate electrical connection with the electrical connection on the appliance.

BARBARA ISABEL WOOD.

REFERENCES CITED

The following references are of record in the file of this patent:

UNITED STATES PATENTS

| Number | Name | Date |
|---|---|---|
| 871,193 | Stull | Nov. 19, 1907 |
| 1,126,219 | Hupp | Jan. 26, 1915 |
| 1,369,748 | Karro | Feb. 22, 1921 |
| 1,394,763 | Scott | Oct. 25, 1921 |
| 1,741,406 | Decker | Dec. 31, 1929 |
| 2,381,077 | Obszarny | Aug. 7, 1945 |

FOREIGN PATENTS

| Number | Country | Date |
|---|---|---|
| 681,477 | France | May 15, 1930 |

OTHER REFERENCES

"Helios," vol. 34, No. 21, May 20, 1928, pages 783–785.